June 9, 1942.  H. I. HOULETTE  2,286,134
TIRE RETREADING MOLD
Filed Aug. 29, 1939  3 Sheets-Sheet 1

Inventor
Henry I. Houlette,
By N. S. McDowell
Attorney

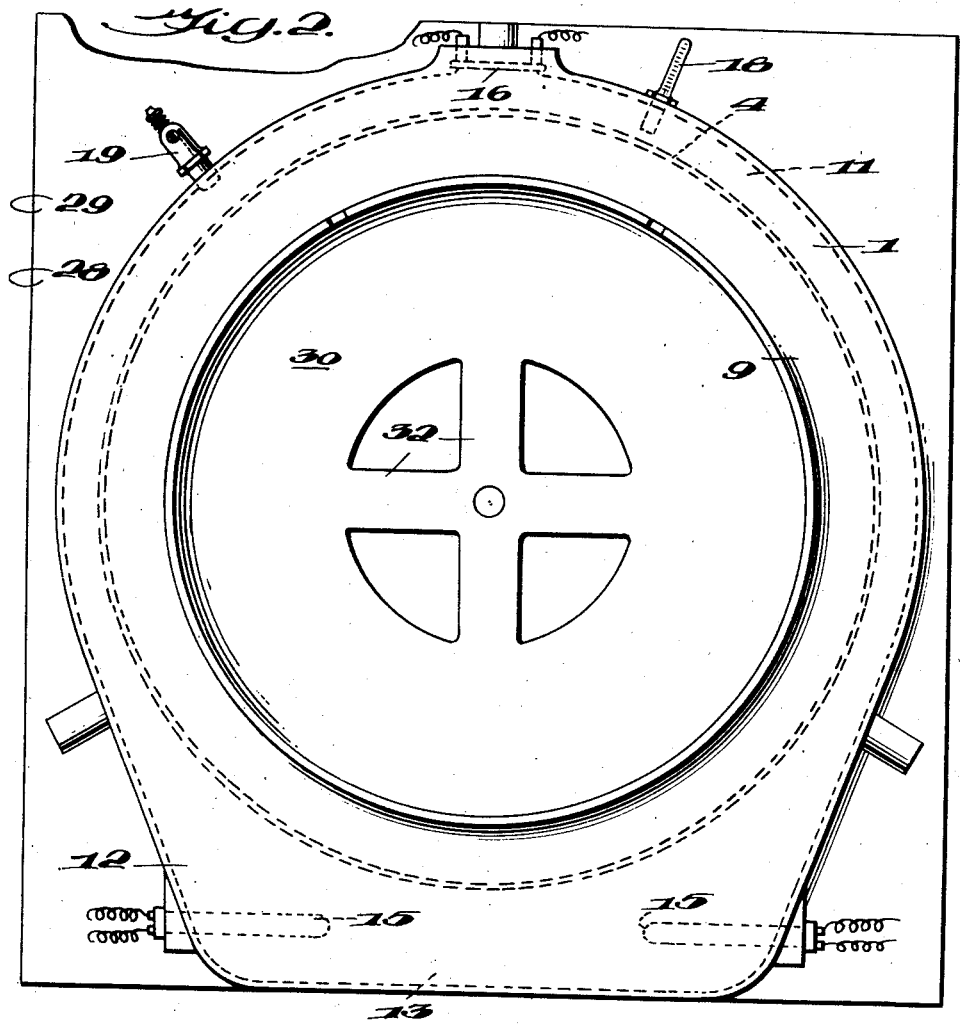
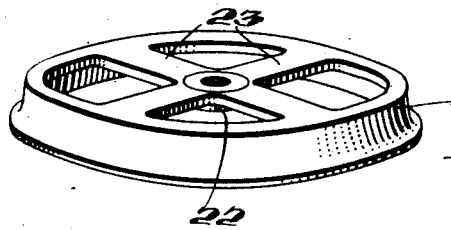

June 9, 1942.  H. I. HOULETTE  2,286,134
TIRE RETREADING MOLD
Filed Aug. 29, 1939   3 Sheets-Sheet 3

Inventor
Henry I. Houlette,
By
Attorney

Patented June 9, 1942

2,286,134

UNITED STATES PATENT OFFICE 2,286,134

TIRE RETREADING MOLD

Henry I. Houlette, Mansfield, Ohio

Application August 29, 1939, Serial No. 292,531

5 Claims. (Cl. 18—18)

This invention relates to an improved mold for retreading worn motor vehicle tire casings. In its more specific aspects, the present invention provides a retreading mold of the full circle type wherein an entire retreading operation is accomplished by a single heating cycle of the mold, and wherein the mold is of integral one-piece design so that a heating fluid may be circulated within its internal passages without loss. Integral or continuous molds hitherto used in tire retreading operations have consisted primarily of thin sheet metal annular rings substantially flat in transverse cross section and having inwardly directed circular ribs formed adjacent to their outer edges, the said ribs being so spaced as to engage the shoulders of a tire casing whereby to confine the newly applied rubber to the crown or road-engaging surfaces, the heating of such molds having been effected through circulating steam through small heat conducting pipes secured directly to the outer surfaces of the thin metallic mold rings.

Tire casings retreaded with mold rings of this well known type are considered by many to possess an objectionable appearance. This is due to the fact that the newly applied rubber extends to the shoulders of the tire casing and not downwardly or inwardly of the shoulders to an extent sufficient to at least partially cover the side walls thereof. In other words, crown retreading of a tire casing results in an appearance which renders such retreading when effected readily discernible, whereas when both the crown and a portion of the side walls are covered with the new rubber, the appearance of a new tire casing is produced, and this is considered more desirable by most tire users.

Retreading molds hitherto used for vulcanizing new rubber on both crown and side walls, and around the full circumference of a tire casing in a single operation, have required the employment of molds composed of a plurality of separable sections, since it has been considered impossible to provide a continuous, unbroken tire mold into which a tire casing could be placed with the molds so formed in cross section as to extend inwardly to a sufficient extent to provide for side wall vulcanization. In the separable type of mold, the latter are first opened to admit of the placing of a tire casing therein, and are then closed and bolted or otherwise clamped together, to confine the tire casing. Molds of this latter type are obviously complex in mechanical design and while steam heated, as most retreading molds are, require the employment of steam-tight gaskets and joints between the relatively separable meeting surfaces of the mold sections.

It is an object of the present invention to provide an improved retreading mold of the integral, continuous and unbroken type wherein both the crown and side wall surfaces of a tire casing may be retreaded around the full circumferences of the casing in a single operation, and the advantages of the sectional mold are obtained with the simplicity and economy of the continuous integral mold.

Another object of the invention relates to the provision of an integral ring-like retreading mold adapted for both crown and side wall vulcanization in combination with means for spreading the rim beads of a tire casing so that the latter may be sufficiently reduced in diameter or collapsed to facilitate its insertion into or removal from the mold proper.

A further object of the invention resides in the provision of a retreading mold having a closed annular steam circulating passage which is in open communication with a well or chamber constituting a part of a steam generator, the walls of the well or casing constituting integral extensions or portions of the mold itself, and wherein provision is made for electrically heating a liquid disposed in said well or chamber for the purpose of generating heated vapors which circulate through the mold pieces and raise the temperature of the mold to that required to the actual vulcanization incident to tire retreading operations.

A still further object of the invention resides in a tire retreading mold having steam generating means integrally formed therewith.

A still further object of the invention resides in the provision of a tire retreading mold possessing structural simplicity, manufacturing economy, convenient to operate and having automatic temperature controlling means.

For a further understanding of the invention, reference is to be had to the following description and the accompanying drawings, wherein:

Fig. 2 is a plan view of the retreading mold showing the enlarged well for receiving the water or other vaporizing fluid used to convey heat from the electric heating elements to the matrix of the mold.

Fig. 6 is a perspective view of one of the ring members which engage the bead portions of a tire in the collapsing operation preparatory to inserting or removing the casing from the mold.

Figure 1:
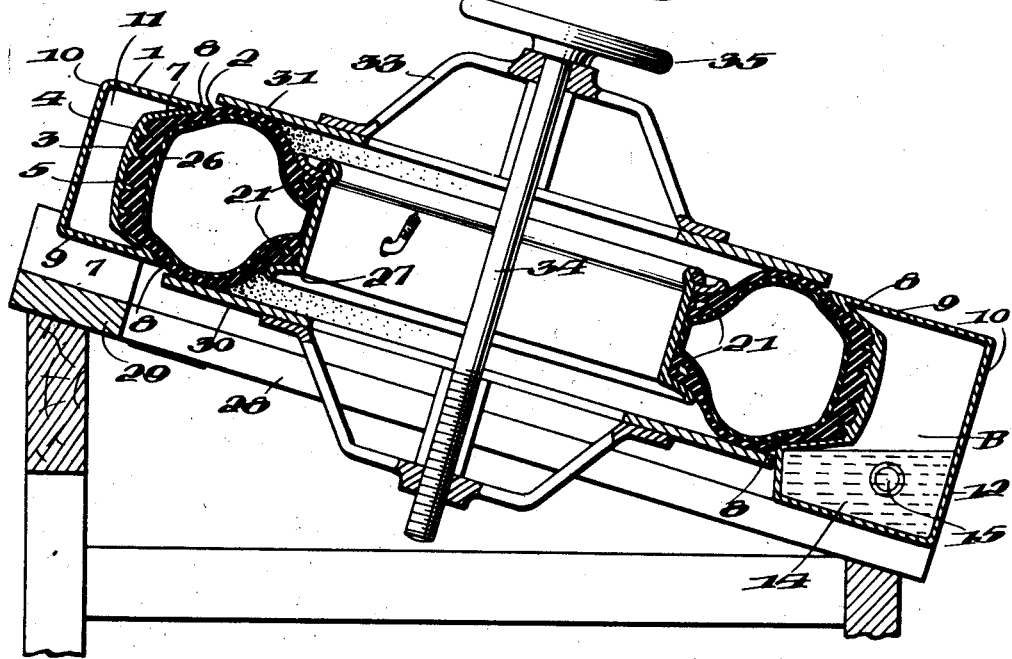
Fig. 1 is a vertical sectional view taken through the retreading mold comprising the present invention, a tire being disposed therein in the process of vulcanization.

Referring more particularly to the drawings, my improved retreading mold comprises a hollow metallic body 1, shaped to receive within its confines a motor vehicle tire casing 2. Inwardly, the body 1 is formed to comprise an integral, unbroken and continuous tire engaging ring 3 which, in transverse cross section, includes an arcuate portion 4 which is shaped to conform to the normal curvature of the crown or road-engaging surface 5 of the tire casing 2. The arcuate portion 4 terminates at the shoulders 6 of the tire casing, but the ring 3 is continued by means of the outwardly flaring inclined portions 7—7, integrally disposed at each side of the portion 4, and of annular formation, which directly engage with the side walls 8—8 of the tire casing well below or within the shoulder region 6.

The angular mold faces 7—7 terminate in spaced, flat, parallel outer walls 9—9, which are integrally united by an outer boundary wall 10. Between the walls 7, 8 and 10, the body of the mold is formed with a substantially annular passage 11, which is unjointed or unbroken and through which steam, or other suitable heating fluid, is adapted to circulate.

The body 1 is formed at one side with an enlargement 12, producing a large well or chamber 13, disposed in open communication with the passage 11. The enlargement 12 has its walls arranged so that one of said walls lies in the same plane as one of the side walls 8, while the opposite wall is laterally offset to provide a liquid-receiving sump 14 into which condensate may drain by gravity from the passage 11. At the side walls of the enlargement 12 and positioned in the sump 14 below the normal liquid level within the latter, is a pair of opposite electrical resistors 15 of the immersion type. These resistors are adapted to be heated by the passage of electric current therethrough, raising the temperature of the liquid in which they are immersed to a steam or vapor generating temperature. The vapor temperature should be sufficiently high so that the ring-like walls 3 of the mold are heated to approximately 275° F.

Communicating with the passage 11 is a bimetallic thermostatic switch 16 which is disposed in the electric circuit 17 employed for energizing the resistors 15. When the vapors circulating through the passage 11 attain the required temperature to effect vulcanization, the switch 16 automatically opens to deenergize said resistors. By this means, automatic control of vulcanizing temperatures may be readily attained. If desired, the body 1 may be provided with an externally disposed thermometer 18 by which the fluid temperatures may be readily ascertained by the person operating the mold whenever desired. Also, the mold may be equipped with a loaded safety valve 19, so that if for any reason the internal pressures should become excessive, such abnormal pressures may be automatically vented to the atmosphere.

In view of the foregoing, it is seen that the present invention provides an unbroken ring-like mold so constructed as to vulcanize new rubber on the worn crown and side wall surfaces of a used tire casing and around the full circumference of the casing in a single heating cycle.

In addition, the unique part of the mold resides in the integral association of a steam generator in connection therewith, avoiding the previous necessity of a separately fired steam generator, having a hose and other connecting lines and joints leading to the steam circulating passages of a retreading mold. With the use of the present invention, by combining the steam generator with the mold, and electrically heating the liquid within the steam generator, my improved retreading mold may be placed in operation in any location where any ordinary house or building circuits of a commercial type are available. By eliminating hose and steam pipe connections, a very considerable degree of mechanical complication is avoided and installation or removal of the mold rendered simple and convenient. Moreover, by electrical heating of the steam generator, virtually automatic temperature regulation may be effected so that overheating and frequent injury of the tires reduced to a negligible factor, if not entirely precluded.

Inasmuch as the mold comprising the present invention is formed with the annular side wall engaging portions 7—7, it is necessary to collapse the tire casing in order to insert the same into or remove the same from the mold, particularly in view of the fact that the diameter of the mold opening at the points of juncture of the walls 7 and 9 is considerably less than the outer diameter of the tire casings which the mold is adapted to receive. This collapsing of the tire casing may be readily effected by the provision of bead engaging bands 20, which latter are formed to embrace the rim beads 21 of the casing. Each of the bands 20 includes a hub 22, united to the peripheral portions of the bands by radial spokes or arms 23. The hubs 22 are threaded for the reception of a screw 24 having a manipulating wheel or knob 25.

Figure 3:
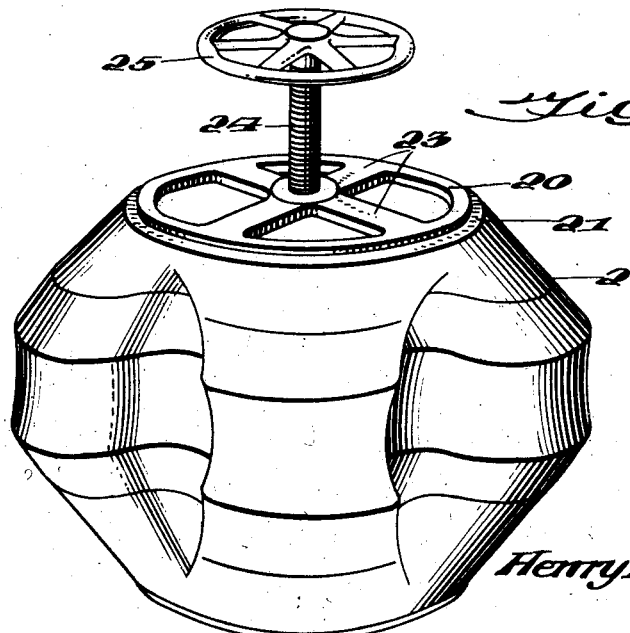
Fig. 3 is a perspective view of a tire prepared for vulcanizing and collapsed in order that it may be positioned within the mold.
Figure 4:
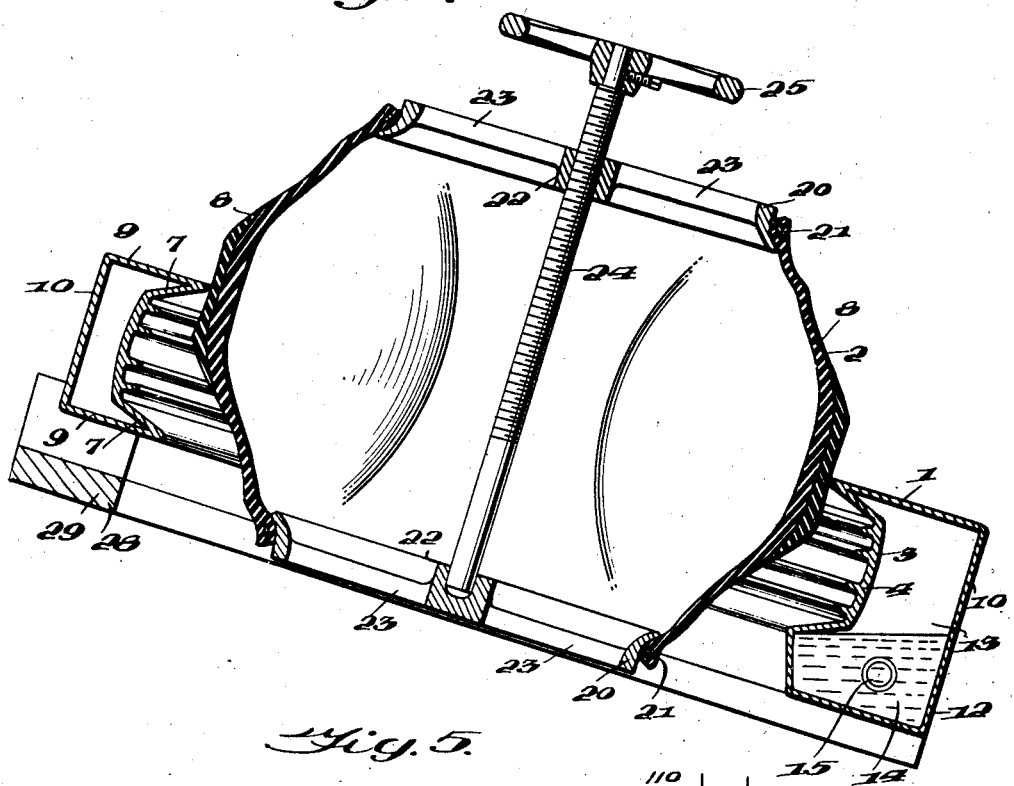
Fig. 4 is a vertical sectional view taken through the tire shown in Fig. 3 as it is being inserted into the mold, the latter also being shown in vertical section.
Figure 5:
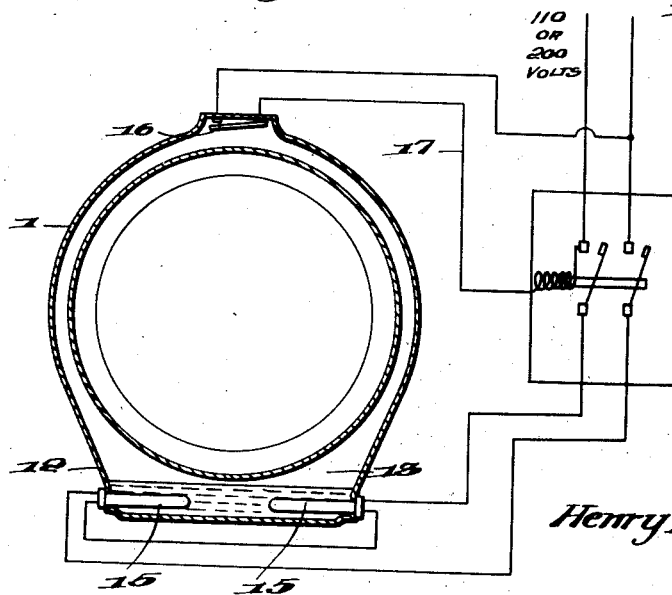
Fig. 5 is a diagrammatic view of the electrical circuit employed in heating the water, the thermostatic control circuit also being illustrated and the mold being shown in horizontal cross section to disclose the immersion type heating units.

It will be seen that when the bands 20 are engaged with beads 21 and the screw 24 rotated, the said bands will be drawn apart, forcing the beads 21 outwardly. This spreading of the beads is continued until the casing collapses to assume the irregular form disclosed in Fig. 3, at which time it is at such a flexible state that it may be readily inserted through the tire receiving opening of the body 1. When thus disposed within the mold, the rotation of the screw 24 is reversed, drawing the bands 20 toward each other, and thus allowing the tire casing to resume its normal shape, in which it engages with the walls 4 and 7 of the mold. The bands 20 are then removed from engagement with the tire casing and an inflatable air bag or tube 26 is inserted in the tire casing while the latter is arranged within the mold. A removable rim 27 is then connected with the beads of the tire casing, as shown in Fig. 1. The tire is then in condition for inflation to the desired degree.

In practice, the mold is carried by a frame or table 28, which latter includes a top or bed 29 which is inclined with respect to the horizontal. The mold is supported flatly on the bed 29 in parallel relation thereto, with the steam generator portion 12 of the mold at its lowermost point. This provides for the maintenance of the desired liquid level in the sump 14 of the steam generator and also for condensate drainage from the passages 11 by gravity into said sump. Removably received on the bed 29 is a metallic side plate 30 so arranged as to engage with one of the side walls of the tire casing within the boundaries of the body 1. A similar clamping plate 31 is arranged on the top of the tire casing and likewise engages with the side walls of the tire casing within the limits of the mold walls 9. Both plates 30 and 31 are formed with hub supporting ribs 32 and hubs 33. The hub of the bottom plate 30 is threaded for the reception of the threaded stem 34 of the clamping screw, while the hub of the plate 31 rotatably receives the non-threaded portion of the stem 34. One end of the stem 34 is equipped with a hand wheel 35, by which the stem may be rotated, thereby drawing the plates 30 and 31 together so that they may exert a clamping or compressive action on the side walls of the tire casing, and preventing said side walls from distending when the bag or tube 26 is filled with air to the required pressures. It will be obvious that when the casing is being inflated, the plates 30 and 31 will confine the side walls of the tire casing against undue expansion in lateral directions and, acting in combination with the rim 27, will cause the outer portions of the tire casing to be firmly maintained in engagement with the arcuate wall 4 of the mold and the angular side walls 7—7.

The retreading mold described is essentially simple in its mechanical design, easy and convenient to operate and not likely to become out of order or occasion repairs. With the present tendency toward standardization followed by the automotive industry in reference to tire sizes, I have found that by employing two of the molds, by far the majority of most passenger vehicle tires may be successfully retreaded. In fact, a single mold will suffice for the tires of the more popularly priced motor vehicles. It is this fact which makes the apparatus so inexpensive to manufacture and use and also the fact that with my improved retreading mold all separate steam generating equipment is rendered unnecessary. These factors combine to enable the average garage or tire store to employ my improved retreading equipment, since the excessive installation cost of previous equipment of this kind is not present. The arcuate wall 4 of my improved mold and also the side walls 7—7 may be suitably machined so that a tire retreaded thereby will bear any desired anti-skid or ornamental design on its tread and side wall surfaces.

Other features which distinguish the present retreading mold from those which have been previously provided are the size and shape of the tire-receiving channel. In the mold described herein, the internal diameter at the tread portion is made substantially equal to the similar portion of the molds in which the tires were originally cured during manufacture. This distance in other types of retreading molds is made considerably less than in the original molds. The cross-sectional form of the tread portion of the present mold is also similar to that of the original mold, the curvature being maintained whereas in certain previous retreading molds, the tread portion is held flat or given a slightly reverse curve. Due to the formation of the present mold, the tire assumes a substantially normal shape while in the mold and when completed will possess a more natural finished appearance than has been possible with previous one-piece retreading molds.

What is claimed is:
1. A full-circle mold for retreading tire casings comprising an integral metallic ring-like body having an annular steam chamber formed therein, inwardly extending annular flanges formed with said body, the inner wall of said body and said flanges cooperating to form a tire-receiving matrix, the flanges being of such length as to extend downwardly along the side walls of the tire casing a considerable distance beyond the shoulders of the casing, an enlarged liquid-receiving well provided at one side of said body, said well being in open communication with said chamber, supporting means for maintaining said body in an inclined position with respect to the horizontal whereby to maintain the liqiud level in said well substantially below said steam chamber, and means for heating the liquid in said well.

2. A full-circle mold for retreading tire casings comprising an integral metallic ring-like body of hollow construction, the circular inner wall of said body being substantially arcuate in transverse section to conform with the curvature of the tread portion of a tire casing engaged thereby, the inner, outer and side walls of said body being spaced to define a substantially annular vapor chamber, the walls of said body at one side thereof being extended to provide a liquid-receiving well arranged below said vapor chamber, and means for heating liquid contained within said well to vapor generating temperatures.

3. A tire retreading mold comprising a hollow metallic unbroken ring-like body having inner and outer walls joined by side walls, said inner wall being channel-shaped in cross section and having the major portions of the side flanges of the channel spaced from the side walls of the body, said body being enlarged at one side to increase the interior size and provide a liquid-receiving reservoir, and electrically energized heating means projecting into said reservoir below the liquid level therein.

4. In a tire retreading mold, a pair of substantially flat ring-like walls, an outer wall connecting the peripheral edges of said ring-like walls, an annular inner wall joined with the inner edges of said ring-like walls, all of said walls cooperating to form a vapor-receiving chamber, said inner wall having a channel-shaped cross section and being disposed entirely between the inner and outer edges of said ring-like walls, the outer surfaces of said channel-shaped inner wall being open to direct contact by vapor in said chamber, and means for producing vapor in said chamber.

5. In a tire retreading mold, a pair of substantially flat ring-like walls having registering enlargements at one side, an outer wall connecting the peripheral edges of said ring-like walls, an annular inner wall joined with the inner edges of said ring-like walls, all of said walls cooperating to form a vapor-receiving chamber, the registering enlargements serving to increase the size of the chamber at one side of said ring-like walls, said inner wall having a channel-shaped cross section and being disposed entirely between the inner and outer edges of said ring-like walls, the outer surfaces of said channel-shaped inner wall being open to direct contact by vapor in said chamber, means for supporting said mold in an inclined position with the enlargements at the lower portion, and means within the enlarged part of the chamber for producing vapor in said chamber.

HENRY I. HOULETTE.